Dec. 28, 1965     H. W. SPEAR     3,225,527
ROTARY LAWN MOWER, BLADE AND SHARPENER
Filed June 23, 1964
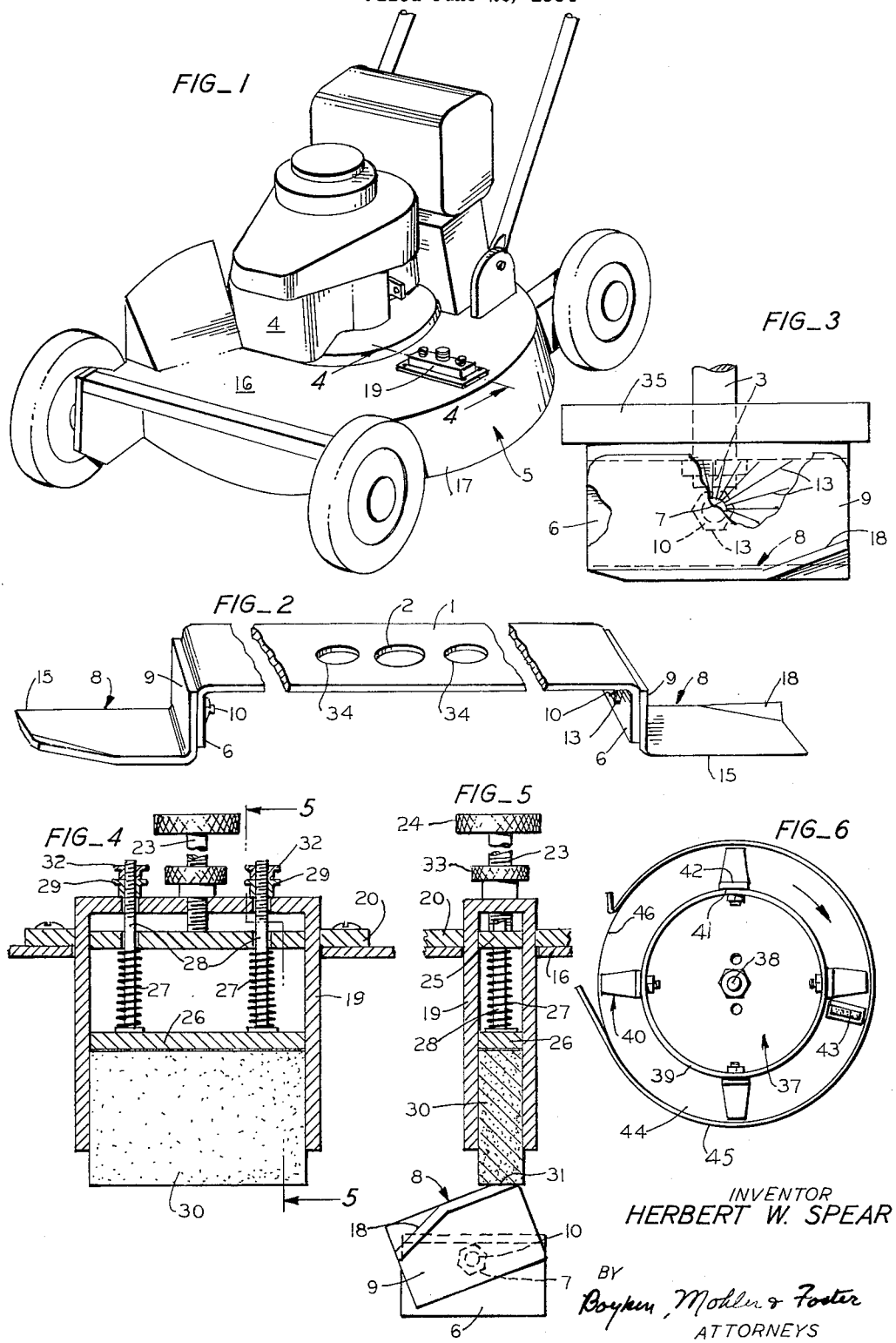
INVENTOR
HERBERT W. SPEAR
BY
Boyken, Mohler & Foster
ATTORNEYS United States Patent Office 3,225,527
Patented Dec. 28, 1965

3,225,527
ROTARY LAWN MOWER, BLADE AND SHARPENER
Herbert W. Spear, San Bernardino, Calif., assignor to Charles A. Crete, Marysville, Calif.
Filed June 23, 1964, Ser. No. 377,282
3 Claims. (Cl. 56—25.4)

This invention is an improvement on my invention as disclosed in my United States Letters Patent No. 3,136,107 issued June 9, 1964 and has for one of its objects the provision of a mower in which the cutting blades are adapted to be sharpened without removal of the cutting blades from the mower, yet which blades may be readily replaceable and are adjustable for varying the distance from the ground at which the cutting occurs as well as for varying the bevel extending to the cutting edge.

Another object of the invention is the provision of a mower provided with means for sharpening the blades while they are on the mower upon rotation of the blades, and which means may remain adjusted for the desired bevel leading to the cutting edge between the periods when the blades are in position for cutting and are actuated for cutting.

An added object is the provision of a rotary mower blade that includes means for deflecting the material as it is cut upwardly in the blade housing for falling into the path of the blades for cutting the material into fine pieces before it is discharged from the mower, so that such material will be in a form for providing an effective mulch.

Other objects and advantages will appear in the description and in the drawings.

In the drawings, FIG. 1 is a perspective view of a rotary mower showing part of the present invention thereon.

FIG. 2 is a perspective view of the blade that is adapted to be attached to the motor shaft of the mower.

FIG. 3 is an enlarged end view of the blade of FIG. 2, as seen from the right hand end of the blade in FIG. 2, but showing the blade connected to the motor shaft of the motor on the mower of FIG. 1.

FIG. 4 is an enlarged sectional view of the sharpening stone and its mounting on the top of the blade housing of FIG. 1 as seen along line 4—4 of FIG. 1.

FIG. 5 is a cross sectional view as seen along line 5—5, of FIG. 4, but showing the blade of FIG. 2 in sharpening relation to the stone.

FIG. 6 is a modified form of the blade structure for mowers of the type having more than one pair of cutting blades.

In my aforesaid patent the blade employed was substantially conventional in that it comprised a flat metal strip having the opposite end portions tilted oppositely transversely of the blade. The blade was centrally secured on the motor shaft in the conventional manner for rotation in one direction about the axis of the motor shaft. The leading edge of each of said end portions was sharpened.

Provision was made in the form of a slanted sharpening stone carried by the top of the housing for engaging the upper side of each end portion along said cutting edge to sharpen each end portion upon rotation of the blade. This arrangement and structure successfully accomplished the desired result of sharpening the blades, but the movement of the sharpened leading edge of the blade necessarily was toward the sharpening stone, requiring very careful adjustment of the cutting edge relative to the stone or the blade and stone would be injured.

Also in said prior invention the cutting portions of the blades could not be replaced if injured, nor was there any means for adjusting the height of the cutting edges of the blades relative to the ground, nor for varying the bevel leading to the cutting edges.

In detail, in the present invention the flat elongated bar 1 of FIG. 2 substantially corresponds to the central portion of a conventional cutting blade employed in various makes of mowers. A central opening 2 is provided in bar 1 intermediate the ends thereof for receiving the lower end of the motor shaft 3 (FIG. 3) that projects downwardly from a conventional motor in motor housing 4 (FIG. 1) on a wheel supported chassis, and into a downwardly opening blade housing 5 that is also on said chassis.

The opposite end portions 6 of the bar 1 are bent downwardly at right angles to the central portion, providing a pair of opposed parallel flanges at opposite ends of the bar 1. Each of these flanges 6 is provided with an opening 7 generally centrally thereof. Openings 7 are coaxial and are adapted to receive bolts on the cutting blades for securing the blades thereto.

The cutting blades are generally designated 8 (FIG. 2) and each blade comprises a flat elongated strip of metal of approximately the same width as that of the flat bar 1. Each blade 8 includes a right angle portion 9 at one end thereof that rigidly carries a bolt 10 that is adapted to extend through each opening 7.

The portions 9 of blades 8 are flat against the oppositely outwardly facing surfaces of flanges 6 and the opposed engaging surfaces of said flanges and portions 9 have complementarily formed ridges and grooves 13 (FIG. 3) extending radially of openings 7 and bolts 10 for holding said portions 9, and consequently blades 8, against rotation about the axis of said bolts when said portions 9 are held tight against the flanges 6 by nuts 14 on said bolts (FIGS. 2, 3).

The blades 8 are positioned generally as shown in FIG. 2, being spaced below the level of bar 1 when in cutting positions, and the leading edge 15 of each blade, when the bar 1 is rotated in one direction about the axis of motor shaft 3, is sharpened by the lower side along said edge being bevelled to said edge.

In FIG. 2 the near edge of blade 8 at the right end of bar 1 is the sharpened edge, while the far edge of blade 8 at the left hand end of bar 1 is the sharpened edge. The bar would be rotated clockwise as seen in FIG. 1.

The top wall of the blade housing 5 is seen in FIGS. 1, 4, 5 and is spaced a substantial distance above the bar 1 and blades 8. The side walls 17 (FIG. 1) of the housing 5 extend generally vertically downwardly and the blades are exposed below the housing for cutting weeds, grass, and the like.

Each of the blades 8 has its outer trailing corner portion 18 slanted upwardly (FIGS. 2, 3). Thus the material that is cut by the cutting edges 15 will be deflected upwardly into the housing 5 and may be cut into fine particles or pieces before being ejected from the housing.

In FIG. 2 the blades 8 are shown as substantially horizontal, but in the event a closer cutting to the ground is desired, the nut 14 may be loosened and the blades tilted to swing the cutting edge downwardly toward the ground, and the nuts then retightened. Thus a substantial adjustment of the cutting edges is possible.

Carried by the top wall 16 of the blade housing, is a sharpening stone housing 19 (FIGS. 1, 4, 5). The wall 16 is formed with an opening through which housing 19 extends and the latter has flanges 20 (FIGS. 4, 5) that secure it to the top wall, or that may be secured to said top wall in any suitable manner, although it is obvious that the housing may be an integral part of the blade housing.

Housing 19 is preferably rectangular and is vertically disposed and has an open lower end. The upper end may threadedly carry a vertical adjusting screw 23 having a finger actuatable head 24 at its upper end accessible to an operator. The lower end of screw 23 centrally engages a horizontally extending bar 25 and between said upper bar 25 and a lower similar bar 26 therebelow are a pair of compressible helical springs 27. Vertical rods 28 at opposite sides of screw 23 slidably extend through openings in upper bar 25 and have stop nuts 29 threadedly secured in their upper ends above bar 25, while the lower ends of said rods 28 are secured to lower bar 26.

A rectangular sharpening stone 30 is rigidly cemented or otherwise suitably secured to the lower side of the lower bar 26, and projects downwardly below the lower open end of housing 19. The lower square edge of the stone 30 is horizontally elongated and of a length substantially equal to the length of the cutting edge 15 of each blade 8. The housing for stone 30 is supported by the housing top 16 in a position for holding the stone so its lower edge extends transversely over the path of travel of blades 8, but spaced above said blades when the latter are in cutting position substantially as shown in FIG. 2.

In order to sharpen the blades 8, the nuts 13 are loosened and the blades are rotated about the axis of bolts 10 so that each blade 8 is in the position shown in FIG. 5 with the blade at the desired inclination transversely of the length of cutting edge 15. The nuts 13 are then tightened and the nuts 29 on rods 28 are adjusted so that the lower edge of the sharpening stone 30 will be engaged by the blade 8 along the bevel 31 which will substantially correspond to the flat planar lower edge of the stone 30, and the blade will engage the lower edge of the stone upon each revolution of the latter. The screw 23 is then adjusted to provide the desired downward tension on the sharpening stone so that the latter may move upwardly against the tension of the springs 27 under the influence of the blades or any foreign object that may enter the housing 5.

Once the sharpening stone is in the desired position there is no necessity for re-adjusting it except to compensate for wear thereof, and the lock nut 32 on each rod may be tightened to releasbly hold the nuts 29, 32 locked in position on rods 28, and lock nut 33 on screw 23 may be tightened to retain the desired tension on springs 27.

With the cutting blades 8 and stone 30 in sharpening position the blades are rotated in the same direction as when in cutting position and the stone 30 will engage the blades along their cutting edges in a wiping direction along the bevel surface toward the cutting edges 15 of said blades, thus sharpening the latter. By this arrangement there is no danger of the cutting edges 15 striking the stone 30 and a yieldable engagement of the desired tension may be established between the stone and the blades. Obviously the stone itself may be set at a slight angle relative to the line of the cutting edge 15 so that the blade will progressively engage the stone as it passes the latter.

After the blades 8 have been sharpened the nuts 13 are loosened and the blades rotated to generally the positions shown in FIG. 2, relative to the central bar 1 and the nuts 13 retightened it being understood that the inclination of the blades transversely of their lengths may be varied to vary the distance of the cutting edges above the ground.

The openings 34 in bar 1 that are at opposite sides of the central opening 2 are conventional and may receive depending lugs (not shown) on a member 35 (FIG. 3) that is rigid on shaft 3, and which lugs may be shear-lugs adapted to shear off if the bar 1 or blades strike a solid object such as a stump or rock.

In FIG. 6 the invention is illustrated with respect to another conventional type of mower in which a circular blade support 37 is secured to the motor shaft 38 instead of a cross bar such as bar 1. The lower side of the blade support 37 is seen in FIG. 6, and the support 37 has a depending flange 39 that would generally correspond to flanges 6 of FIG. 2 to which the blades 40 may be secured in the same manner as in FIG. 2. Flattened portions 41 on flange 39 are adapted to engage the right angle portions 42 on blades 40. The sharpening stone 43 and its mounting correspond in every way to the structure shown in FIGS. 4, 5 and are mounted on the top wall 44 of the blade housing, and the latter has a depending generally annular wall 45 coaxial with the shaft 38 and a grass outlet 46 is provided in one side.

The above structure in FIG. 6 is conventional except for flange 39 and blades 40. In the conventional mower the flange 39 is omitted and four cutting blades positioned similar to the four shown in FIG. 6 are bolted to the horizontal annular marginal portion of a circular blade support by vertical bolts, and there is no sharpening means.

It is again noted that the central bar 1 of FIG. 2 (except for the flanges 6) is conventional as to shape and manner of securement to a standard mower, hence the present invention is adapted to be positioned on standard rotary mowers by merely replacement of the blade units and the installation of the sharpening unit, although the invention may be standard equipment, in which case the support for the sharpening stone may be formed in the blade housing if found to be more convenient or economical.

While I have shown and described certain preferred embodiments of the invention, it will be apparent that the invention is capable of further variation and modification without departing from the scope of the invention as defined by the claims appended hereto.

I claim:

1. A rotary mower that includes a portable, wheel mounted mower chassis having a blade housing and a motor driven, rotatable, vertical shaft depending into said housing, and which shaft is provided with means on its lower end for supporting and securing a plurality of generally horizontally disposed, horizontally extending cutting blades to said shaft for movement of such blades said shaft in one direction in an annular path about said shaft concentric with the latter when said shaft is rotated in one direction:

(a) a plurality of said cutting blades extending longitudinally thereof generally radially outwardly of said shaft, each blade being bevelled on its underside along the leading edge thereof relative to said direction of movement of said blades in said path providing a cutting edge extending longitudinally of each blade;

(b) releasable locking means for each blade movable from a locked to a released position for locking each blade rigid with said shaft when said locking means is in said locked position, and for releasing each blade for generally vertical movement of each blade from a lower cutting position to an elevated sharpening position when said locking means is in said released position, said locking means being movable from said released position to said locked position when said blade is in said sharpening position and is in said cutting position, respectively;

(c) blade sharpening means carried on said blade housing at a point above said annular path for sharpening each blade along said cutting edge upon engagement with each blade during movement of the latter in said path when said blade is locked in said sharpening position;

(d) means for supporting said sharpening means on said blade housing in a position for engagement with said blade along its cutting edge when said blade is in said sharpening position and spaced above said blade when said blade is in said cutting position;

(e) said cutting edge of each of said blades facing in a direction opposite to the direction of movement of said blades in said path when each blade is in said elevated sharpening position, whereby the engagement between said sharpening means and said blade will be progressively in a direction transversely of each blade toward said cutting edge; and (f) said blade being transversely inclined relative to said path to position said cutting edge elevated relative to the edge of each blade opposite to said cutting edge, to enable said progressive sharpening of each blade toward said cutting edge.

2. In a rotary lawn mower that includes a portable, wheel mounted mower chassis having a motor driven, rotatable, vertical shaft provided with blade supporting means on its lower end for supporting a plurality of substantially horizontally extending cutting blades rigid with said shaft for movement of said blades with said shaft in one direction in an annular path about said shaft when said shaft is rotated in said one direction:

(a) a plurality of substantially horizontally elongated, flat-sided, cutting blades extending longitudinally thereof radially outwardly of said blade supporting means, and one of the longitudinally extending edges of each blade being a leading edge relative to the direction of movement thereof in said path, and each blade also being bevelled on its underside along said leading edge to the upper surface of each blade whereby said leading edge is sharpened to provide a cutting edge;

(b) blade securing means for releasably securing each blade to said blade supporting means for movement of each blade relative to said blade supporting means from a lowered cutting position at a level below said shaft and said blade supporting means and with said cutting edge leading relative to said movement of said blade in said path in said one direction to an elevated sharpening position spaced above said cutting position with said cutting edge trailing relative to said direction of movement of said blade in said path, and with the bevelled surface along said cutting edge facing upwardly and horizontal;

(c) said blade securing means including means for locking said blade in said cutting position and in said sharpening position respectively;

(d) blade sharpening means carried by said chassis at a point spaced above said annular path of said blades when the latter are in said cutting position and in a position for engagement with the bevelled surface of said blade along said cutting edge when said blade is locked in said sharpening position and is moved in said one direction about the axis of said shaft.

3. In a rotary lawn mower as defined in claim 2:

(e) said blade securing means including a flange on the end of each blade that is adjacent to said blade supporting means extending upwardly from said blade; and (f) a horizontally extending bolt having a nut thereon releasably connecting the said flange on each blade to said blade supporting means.

References Cited by the Examiner

UNITED STATES PATENTS

| | | | |
|---|---|---|---|
| 1,441,141 | 1/1923 | Andrews | 56—295 |
| 2,826,032 | 3/1938 | Hayes | 56—255 |
| 3,086,346 | 4/1963 | Zimmerman | 56—25.4 |

FOREIGN PATENTS

| | | |
|---|---|---|
| 215,528 | 6/1958 | Australia. |
| 321,009 | 6/1957 | Switzerland. |

ABRAHAM G. STONE, *Primary Examiner.*

RUSSELL R. KINSEY, *Examiner.*